US011194922B2

(12) United States Patent
Parida et al.

(10) Patent No.: US 11,194,922 B2
(45) Date of Patent: Dec. 7, 2021

(54) PROTECTING STUDY PARTICIPANT DATA FOR AGGREGATE ANALYSIS

(71) Applicant: INTERNATIONAL BUSINESS MACHINES CORPORATION, Armonk, NY (US)

(72) Inventors: Laxmi P. Parida, Mohegan Lake, NY (US); Daniel Enoch Platt, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 15/907,398

(22) Filed: Feb. 28, 2018

(65) Prior Publication Data
US 2019/0266343 A1 Aug. 29, 2019

(51) Int. Cl.
*G06F 21/62* (2013.01)
*H04L 9/08* (2006.01)
(Continued)

(52) U.S. Cl.
CPC .......... *G06F 21/6227* (2013.01); *H04L 9/008* (2013.01); *H04L 9/0819* (2013.01);
(Continued)

(58) Field of Classification Search
CPC ... H04L 9/0819; H04L 9/008; H04L 63/0442; H04L 63/0478; H04L 2209/08; G06F 21/6245; G06F 21/6227
(Continued)

(56) References Cited

U.S. PATENT DOCUMENTS 5,349,643 A * 9/1994 Cox ...................... G06F 9/4416
713/155
6,098,056 A * 8/2000 Rusnak .............. G06Q 20/3821
705/75
(Continued)

OTHER PUBLICATIONS

Anonymously; "Sharing confidential data between application users in a combined (symmetric/asymmetric) encryption scheme"; http://ip.com/IPCOM/000228586D; Jun. 20, 2013, 6 pages.
(Continued)

*Primary Examiner* — Michael W Chao
*Assistant Examiner* — Peiliang Pan
(74) *Attorney, Agent, or Firm* — Cantor Colburn LLP; Kristofer Haggerty

(57) ABSTRACT

Embodiments of the invention include systems and methods for protecting study participant data for aggregate analysis. Aspects include sending a broker encryption key to a plurality of subjects. Aspects also include receiving double-encrypted subject data from the plurality of subjects. Aspects also include decrypting the double-encrypted subject data with a broker decryption key to generate single-encrypted subject data for the plurality of subjects. Aspects also include aggregating the single-encrypted subject data for the plurality of subjects to generate an aggregated single-homomorphically encrypted data set. Aspects also include including a plurality of random factors in the aggregated single-encrypted data set. Aspects also include sending the aggregated single-homomorphically encrypted data set to a researcher.

18 Claims, 6 Drawing Sheets

(51) Int. Cl.
*H04L 9/00* (2006.01)
*H04L 29/06* (2006.01)

(52) U.S. Cl.
CPC ...... *H04L 63/0442* (2013.01); *H04L 63/0478* (2013.01); *H04L 2209/08* (2013.01)

(58) Field of Classification Search
USPC .......................................................... 713/164
See application file for complete search history.

(56) References Cited

U.S. PATENT DOCUMENTS

| | | | | |
|---|---|---|---|---|
| 6,470,085 B1* | 10/2002 | Uranaka | ................. | G06F 21/10 380/231 |
| 6,792,474 B1* | 9/2004 | Hopprich | .......... | H04L 29/12283 370/392 |
| 7,003,667 B1* | 2/2006 | Slick | ..................... | G06F 21/608 380/243 |
| 8,473,740 B2* | 6/2013 | Vion-Dury | ................ | H04L 9/14 380/277 |
| 8,515,058 B1* | 8/2013 | Gentry | .................... | H04L 9/008 380/28 |
| 9,055,038 B1* | 6/2015 | Lu | ....................... | H04L 63/0428 |
| 9,124,417 B2* | 9/2015 | Kolesnikov | ............... | H04L 9/06 |
| 9,215,219 B1 | 12/2015 | Krendelev et al. | | |
| 9,565,020 B1* | 2/2017 | Camenisch | ........... | H04L 9/0894 |
| 10,447,668 B1* | 10/2019 | Norum | ...................... | H04L 9/12 |
| 2002/0144118 A1* | 10/2002 | Maruyama | ............ | H04L 63/045 713/170 |
| 2003/0051135 A1* | 3/2003 | Gill | ......................... | H04L 63/04 713/160 |
| 2003/0187805 A1* | 10/2003 | Shen | .................... | G06Q 50/188 705/80 |
| 2003/0194090 A1* | 10/2003 | Tachikawa | .......... | H04L 63/0853 380/270 |
| 2004/0083392 A1* | 4/2004 | Yang | ....................... | H04L 9/083 726/27 |
| 2005/0027979 A1* | 2/2005 | Peck | .................... | H04L 9/0833 713/161 |
| 2005/0108528 A1* | 5/2005 | Wanish | ............... | H04L 63/0464 713/168 |
| 2006/0045478 A1* | 3/2006 | You | ................. | H04N 21/43632 386/259 |
| 2008/0288410 A1* | 11/2008 | Nino | ................ | H04N 21/63775 705/52 |
| 2010/0169648 A1* | 7/2010 | Yoshida | ................. | H04L 9/083 713/175 |
| 2011/0264920 A1 | 10/2011 | Rieffel et al. | | |
| 2012/0216041 A1* | 8/2012 | Naono | .................. | H04L 9/0894 713/171 |
| 2012/0311035 A1* | 12/2012 | Guha | .................. | G06F 21/6218 709/204 |
| 2013/0318347 A1* | 11/2013 | Moffat | .................. | H04L 9/0894 713/168 |
| 2014/0157388 A1* | 6/2014 | Tsumura | ............... | H04W 12/06 726/7 |
| 2014/0161258 A1* | 6/2014 | Yang | .................. | H04W 12/041 380/270 |
| 2014/0372769 A1* | 12/2014 | Kerschbaum | ........... | H04L 9/008 713/189 |
| 2015/0007258 A1* | 1/2015 | Patey | .................. | G06K 9/00885 726/1 |
| 2015/0046340 A1* | 2/2015 | Dimmick | .............. | H04L 63/104 705/72 |
| 2015/0149776 A1* | 5/2015 | Chastain | ............... | H04L 9/0877 713/169 |
| 2015/0295716 A1 | 10/2015 | Liu | | |
| 2015/0326547 A1* | 11/2015 | Carlson | ............... | H04L 63/0442 713/171 |
| 2016/0004874 A1* | 1/2016 | Ioannidis | ................ | G06F 17/16 713/165 |
| 2016/0330573 A1* | 11/2016 | Masoud | .................. | G06F 21/44 |
| 2016/0371684 A1 | 12/2016 | Abbott et al. | | |
| 2017/0163421 A1* | 6/2017 | Chase | .................... | H04L 9/3247 |
| 2017/0180239 A1* | 6/2017 | Hittel | ..................... | H04W 12/04 |
| 2018/0019868 A1* | 1/2018 | Pe'er | ......................... | H04L 9/14 |
| 2018/0019997 A1* | 1/2018 | Chabanne | ........... | H04L 63/0861 |
| 2018/0139188 A1* | 5/2018 | Iyer | ........................ | H04L 9/0894 |
| 2018/0248857 A1* | 8/2018 | Annam | .................. | H04L 9/3213 |
| 2018/0276417 A1* | 9/2018 | Sanchez | .................. | H04L 9/008 |
| 2018/0359259 A1* | 12/2018 | Leon | ..................... | H04L 63/062 |
| 2019/0238519 A1* | 8/2019 | Bikumala | ........... | H04L 63/0442 |
| 2020/0026867 A1* | 1/2020 | Nicholls | ................ | G06Q 30/08 |

OTHER PUBLICATIONS

Blasco, S. et al.; "A three-layer approach for protecting smart-citizens privacy in crowdsensing projects"; 2015 34th International Conference of the Chilean Computer Science, 5 pages.

Noh, G. et al.; "Sharing Privacy Protected and Statistically Sound Clinical Research Data Using Outsourced Data Storage"; Journal of Applied Mathematics, 381316 (12 pp.), 2014.

Donal Beaver, et al., "Instance-Hiding Proof Systems", Work done at Harvard University, supported in part by NSF grant CCR-870-4513, Sep. 17, 1993, 27 pages.

\* cited by examiner

PROTECTING STUDY PARTICIPANT DATA FOR AGGREGATE ANALYSIS

BACKGROUND

The present invention generally relates to epidemiological studies. More specifically, the present invention relates to protecting study participant data in aggregate analysis.

Analysis of large sets of aggregate data can provide valuable statistical information in a variety of contexts. Epidemiological studies, for instance, involve analyzing health and disease processes and conditions in defined populations. Epidemiological studies can include the analysis of a variety of data, including for instance biological and clinical data, to uncover patterns and causative factors for biological conditions. Increasingly, confidential and sensitive personal data, including genetic data of an individual, is used and exchanged in aggregate studies.

SUMMARY

Embodiments of the present invention are directed to a computer-implemented method for protecting study participant data for aggregate analysis. A non-limiting example of the method includes sending, by a processor, a broker encryption key to a plurality of subjects. The method also includes receiving, to the processor, double-encrypted subject data from the plurality of subjects. The method also includes decrypting, by the processor, the double-encrypted subject data with a broker decryption key to generate single-encrypted subject data for the plurality of subjects. The method also includes aggregating, by the processor, the single-encrypted subject data for the plurality of subjects to generate an aggregated single-homomorphically encrypted data set. The method also includes including, by the processor, a plurality of random factors in the aggregated single-homomorphically encrypted data set also encoded with a garbled circuit protocol. The method also includes sending, by the processor, the aggregated single-homomorphically encrypted data set to an analyst.

Embodiments of the invention are directed to a computer program product for protecting study participant data for aggregate analysis. The computer program product includes a computer readable storage medium having program instructions embodied therewith, wherein the instructions are executable by a processor to cause the processor to perform a method. A non-limiting example of operating the method includes sending a broker encryption key to a plurality of subjects. The method also includes receiving double-encrypted subject data from the plurality of subjects. The method also includes decrypting the double-encrypted subject data with a broker decryption key to generate single-encrypted subject data for the plurality of subjects. The method also includes aggregating the single-encrypted subject data for the plurality of subjects to generate an aggregated single-homomorphically encrypted data set. The method also includes including a plurality of random factors in the aggregated single-homomorphically encrypted data set also encoded with a garbled circuit protocol. The method also includes sending the aggregated single-homomorphically encrypted data set to an analyst.

Embodiments of the present invention are directed to a processing system for protecting study participant data for aggregate analysis. The processor includes a processor in communication with one or more types of memory, the processor configured to perform a method. A non-limiting example of operating the method includes sending a broker encryption key to a plurality of subjects. The method also includes receiving double-encrypted subject data from the plurality of subjects. The method also includes decrypting the double-encrypted subject data with a broker decryption key to generate single-encrypted subject data for the plurality of subjects. The method also includes aggregating the single-encrypted subject data for the plurality of subjects to generate an aggregated single-homomorphically encrypted data set. The method also includes including a plurality of random factors in the aggregated single-homomorphically encrypted data set also encoded with a garbled circuit protocol. The method also includes sending the garbled aggregated single-homomorphically encrypted data set to an analyst for further reduction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
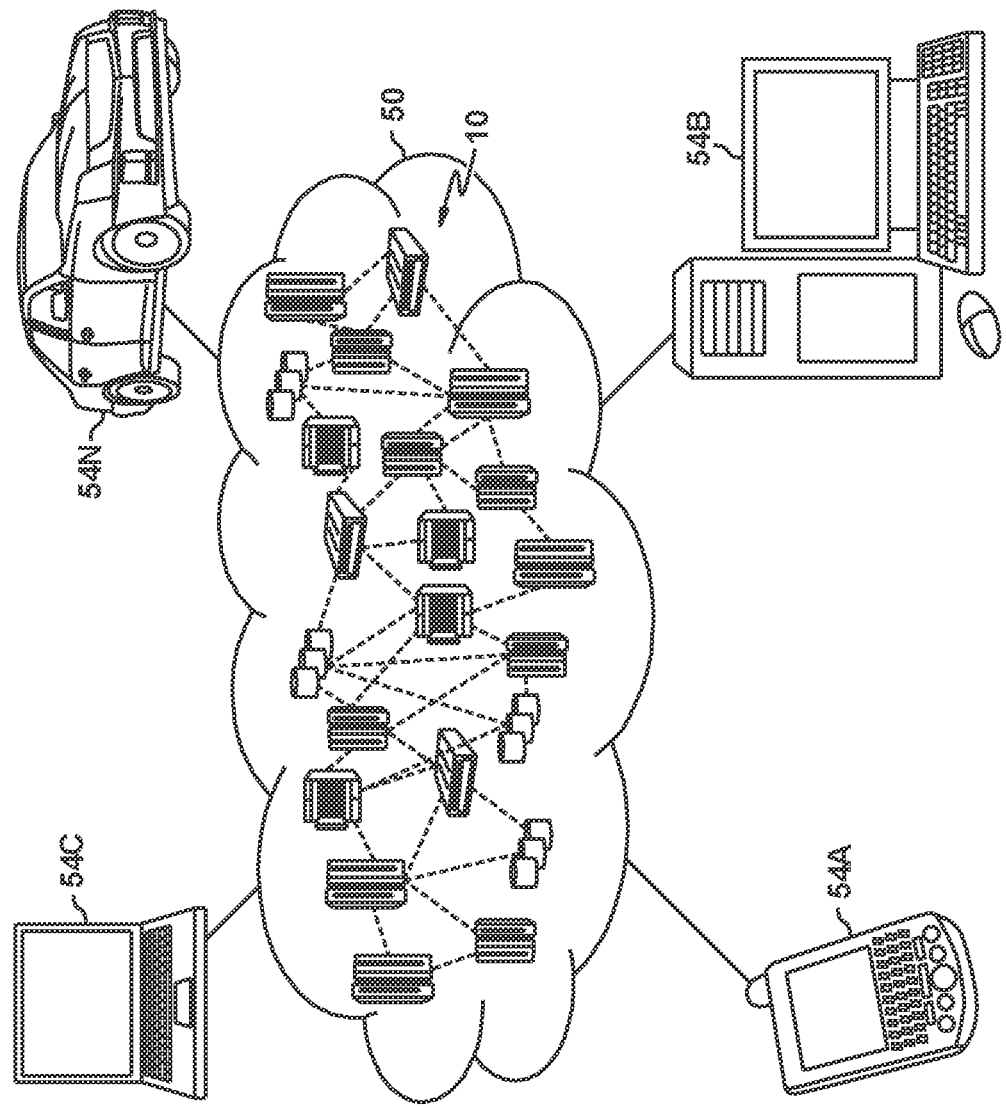
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, epidemiology involves the study of distribution and causative events and factors pertaining to health or medical conditions, such as disease. Sensitive and personalized patient data, such as genetic data, can provide useful information in epidemiological analysis. For instance, individual genetic data can be studied across populations to reveal potential hereditary causes of disease.

Security and anonymity in/when transmitting sensitive information are persistent concerns. Study participants and would-be study participants desire increased security when transmitting data electronically. The desired anonymity can extend to the ultimate researchers analyzing the data. Large public-participation studies, such as 23andMe collaboration through ResearchKit, offer the possibility of expanded avenues for probing rare alleles (genetic variants) that can be used, for instance, to understand the genetic basis for disease. However, concerns about information security through electronic transmission remain. For example, individuals with rare alleles, even when data is securely transmitted, can be re-identified from aggregate information based upon the presence of the rare allele. For example, where a subject has a rare allele and type II diabetes, the subject's identity can be deduced from the aggregate data and patient medical records. Analysts seeking the sensitive data, however, must be able to extract the needed information to perform the relevant analysis.

Turning now to an overview of the aspects of the invention, one or more embodiments of the invention include systems and methods for handling confidential research study records in order to maintain confidentiality of an individual research study participant. Embodiments of the invention can prevent a specific individual's data from being known or derived by other study participants, brokers aggregating the data, and researchers analyzing the data, including researchers computing odds ratios, regression coefficients, and similar data on aggregate records. A broker can be a third party individual or entity used as a data transfer facilitator. Embodiments of the invention can protect study participants from re-identification after aggregate data analysis. Embodiments of the invention can also protect against whole genome sequence (GWAS) inferences.

The above-described aspects of the invention address the shortcomings of the prior art by systems and methods in which a broker sends an encryption key to a subject in possession of homomorphically encrypted data, receives the homomorphically encrypted data after the subject encrypts the data with the broker's key, aggregates the data, includes random factors in the data encrypted with a garbled circuit protocol known to persons skilled in the art as the Yao protocol, and sends the encrypted garbled data to an analyst. An analyst decrypting the homomorphically encrypted aggregate data can combine the data to only in prescribed ways to produce the statistics of interest, such as odds ratios and regression coefficients in order for the random factors coded in the data to cancel each other.

Turning now to a more detailed description of aspects of the present invention, it is understood in advance that although this description includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, illustrative cloud computing environment 50 according to one or more embodiments of the present invention is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
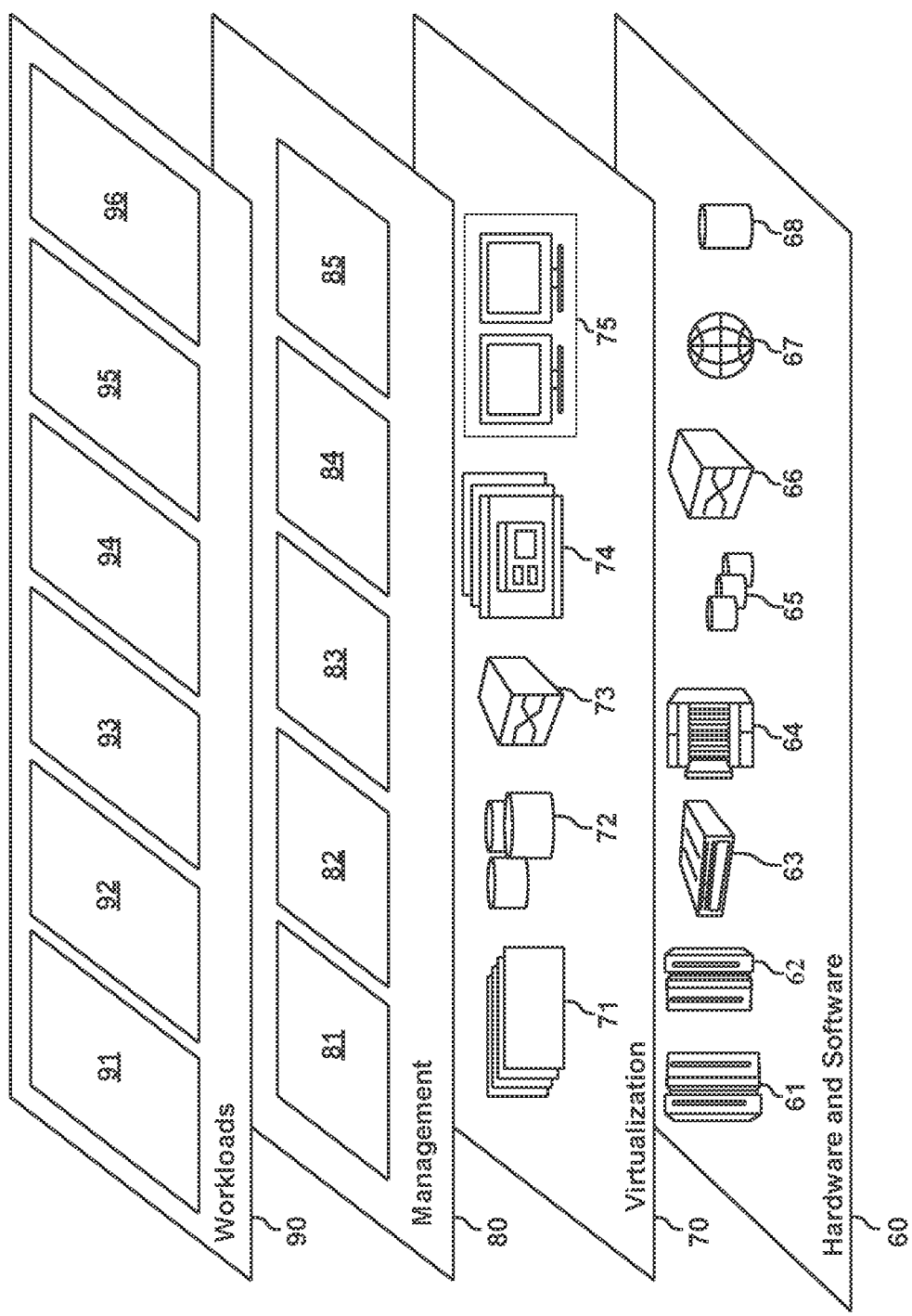
FIG. 2 depicts abstraction model layers according to an embodiment of the present invention.

Referring now to FIG. 2, a set of functional abstraction layers provided by cloud computing environment 50 (FIG. 1) according to one or more embodiments of the present invention is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and protecting study participant data in epidemiological studies 96.

Figure 3:
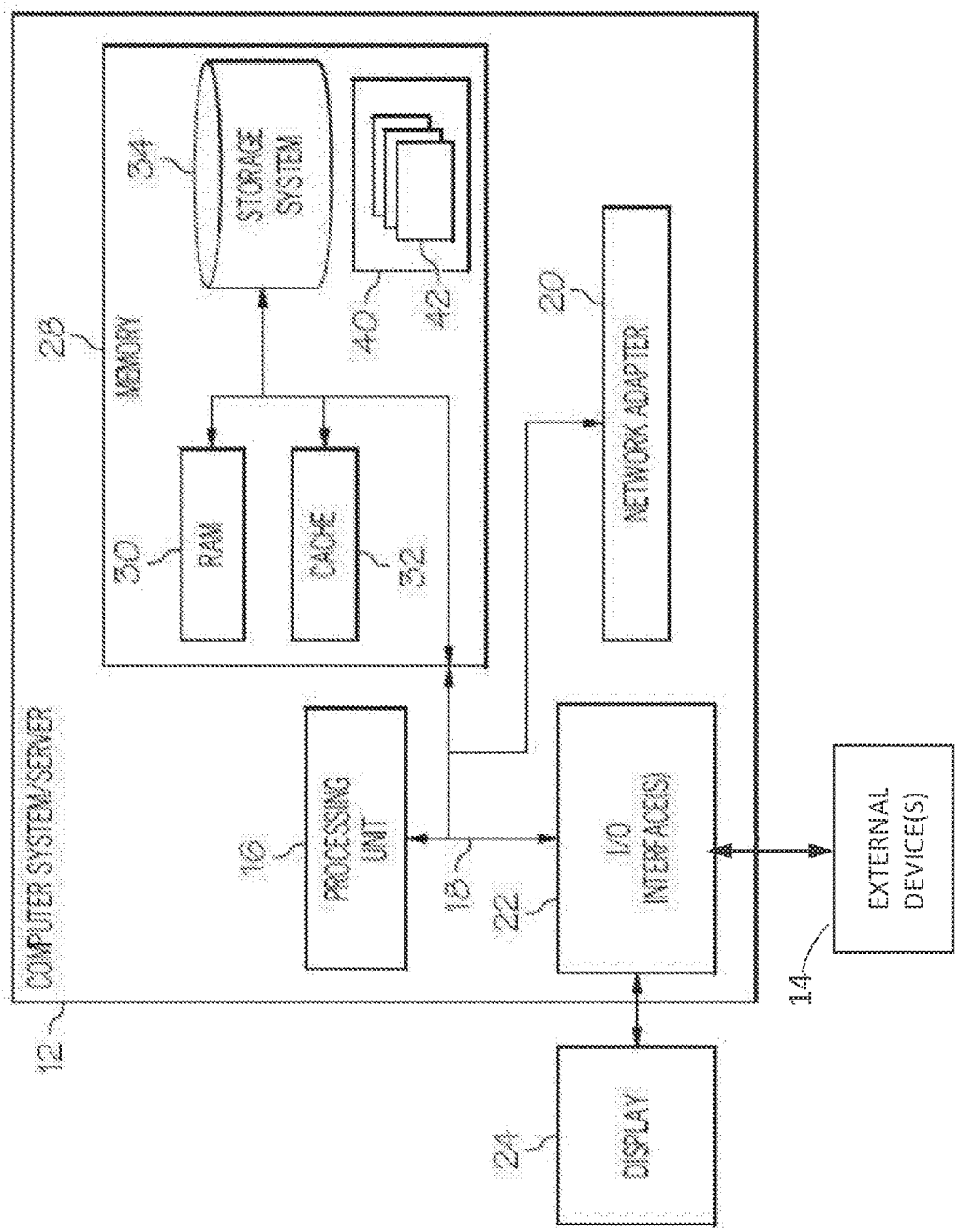
FIG. 3 depicts a computer system according to one or more embodiments of the present invention.

Referring now to FIG. 3, a schematic of a cloud computing node 100 included in a distributed cloud environment or cloud service network is shown according to one or more embodiments of the present invention. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer system/server 12 in cloud computing node 100 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32 directly addressed by the system address bus, and provides or accepts data directly from the system data bus. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to I/O interface(s) 22 by one or more data media interfaces. Although storage 34 is shown as being within the system memory 28, the storage 34 can be connected to the I/O interface(s) 22 (not shown). These items are usually handled through an I/O controller that the CPU communicates with over the system bus. As will be further depicted and described below, storage 34 may contain and provide to memory 28 for executing at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out one or more functions and/or methodologies in accordance with some embodiments of the present invention.

Computer system/server 12 can also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present invention provide automated real-time feedback to a surgeon or clinical team obviating the need to wait for results from a separate pathology lab. Embodiments of the present invention perform robust analysis on tissue that remains attached to a patient. In some embodiments, the equivalent of cellular level pathology can be performed on tissue attached to a patient.

Figure 4:
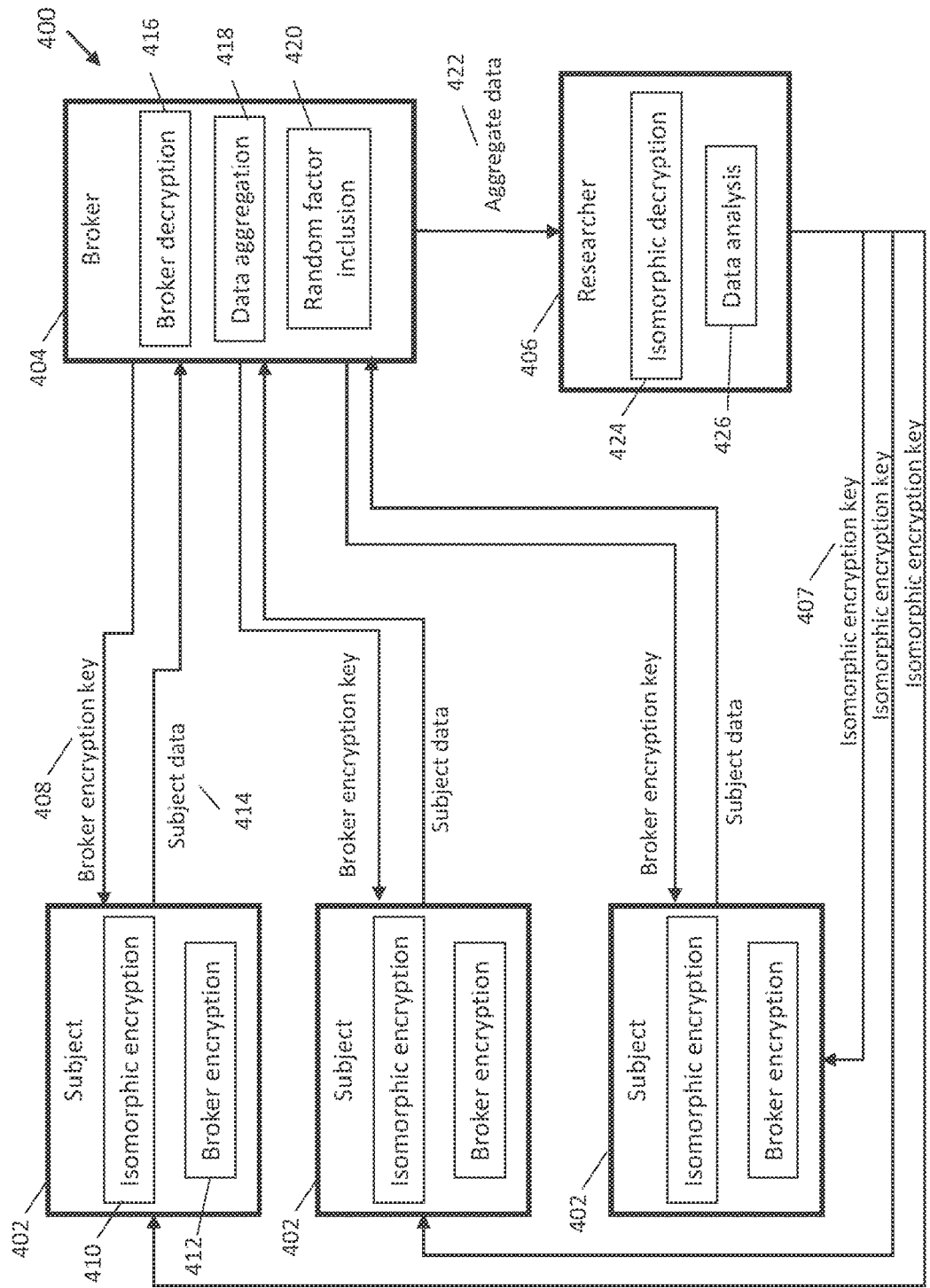
FIG. 4 depicts a diagram illustrating an exemplary system for protecting study participant data according to one or more embodiments of the present invention.

Referring now to FIG. 4, a diagram illustrating an exemplary system 400 according to embodiments of the invention is shown. The system 400 includes a plurality of subject modules 402, such as research participant modules. The system 400 can also include a broker module 404. In some embodiments of the invention, the system 400 includes a single broker module 404. In some embodiments of the invention, the system 400 includes a plurality of broker modules 404. The system 400 can also include a researcher module 406. The researcher module 406 includes a module of an individual or entity seeking to perform one or more statistical analyses on aggregate subject data.

In embodiments of the invention, encryption keys are transmitted. The broker module 404 can send a broker encryption key to each of the plurality of subject modules 402. Broker encryption key can be any encryption key for the encryption of data. The broker encryption key can be part of a symmetric or an asymmetric encryption system. The broker encryption key can be, for example, a public key or a private key of a public-private key pair. In some embodiments of the invention, the broker encryption key is a private key of a public-private key pair. The researcher module 406 can send an isomorphic encryption key 407 to each of the plurality of subject modules 402. The isomorphic encryption key 407 is an encryption key capable of performing isomorphic encryption.

In the subject module 402, an isomorphic encryption engine 410 can encrypt the subject data with the isomorphic encryption key. The subject module 402 can also include a broker encryption engine 412. The broker encryption engine 412 can encrypt the subject data, such as isomorphically encrypted subject data generated by the isomorphic encryption engine 410 with the broker encryption key 408.

The broker module 404 can include a broker decryption engine 416. The broker decryption engine 416 can decrypt subject data 414 transmitted by the subject module 402 with a broker decryption key. The broker decryption key can be the corresponding key to the broker encryption key in an asymmetric key pair or a corresponding key to the broker encryption key in a symmetric encryption system.

The broker module 404 can include a data aggregation engine 418. The data aggregation engine 418 can aggregate the encrypted subject data. For example, the aggregation engine 418 can aggregate subject data that is isomorphically encrypted and has been decrypted by the broker encryption key. The broker module 404 can include a random factor inclusion engine 420. The random factor inclusion engine 420 can include random factors in the aggregate data, wherein the random factors are such that they will cancel when combined to produce odds ratios, compute regression coefficients, and the like. The broker module 404, in embodiments of the invention, transmits aggregate data 422, such as encrypted and random factored data generated by the broker module 404, to the researcher module 406.

The researcher module 406 includes an isomorphic decryption engine 424 and a data analysis engine 426. The isomorphic decryption engine can decrypt the aggregate data 422 with a key capable of decrypting data encrypted with the isomorphic encryption key 407. The isomorphic decryption engine 424 can perform statistical analyses on the random factored aggregate data to generate the statistics of interest.

Figure 5:
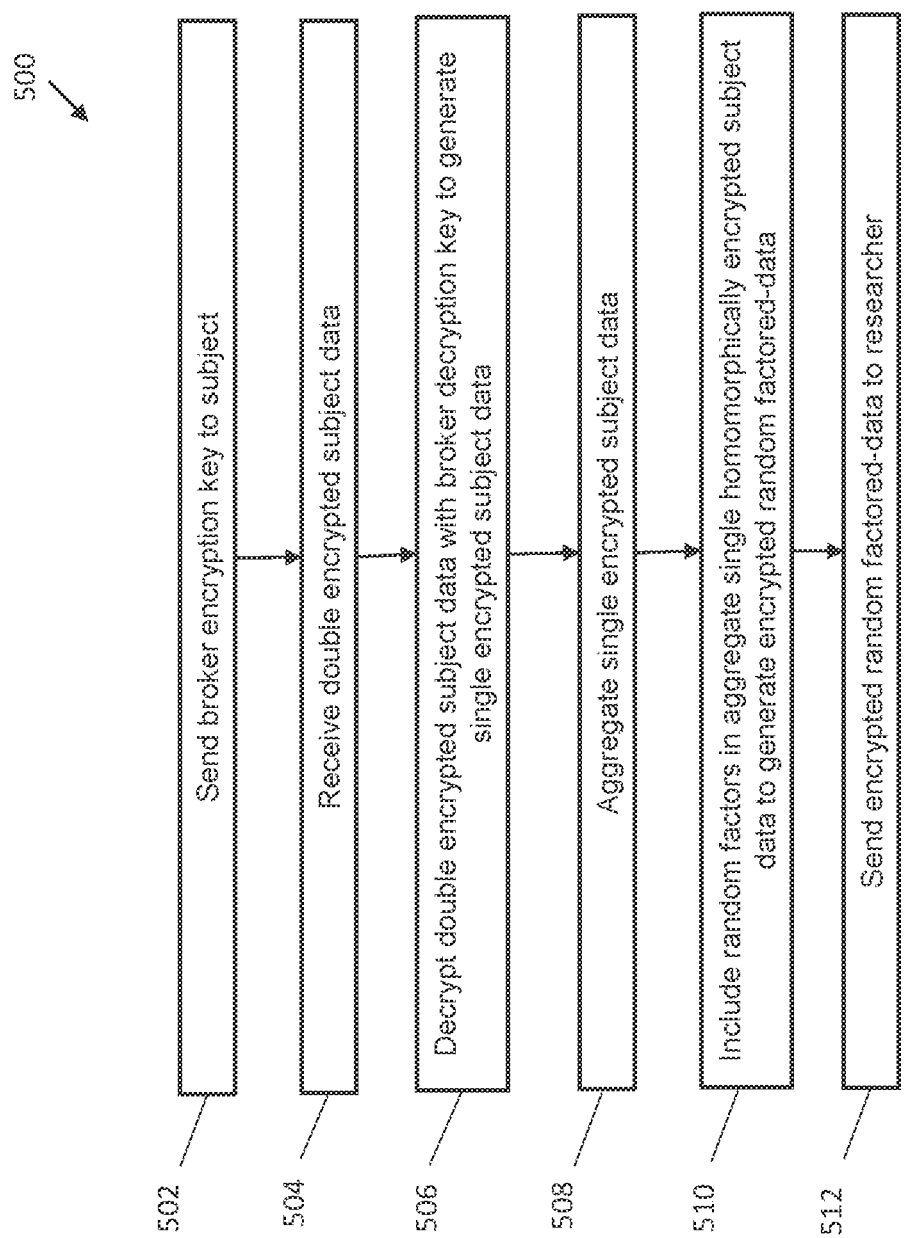
FIG. 5 is a flow diagram illustrating a method for protecting study participant data according to one or more embodiments of the present invention.

Turning now to FIG. 5, a flow chart illustrating an exemplary method 500 for protecting study participant data for aggregate analysis according to one or more embodiments of the present invention is shown. The method 500 includes, as shown at block 502, sending a broker encryption key to a subject. The method 500 also includes, as shown at block 504, receiving double encrypted subject data. In some embodiments of the invention, the double encrypted subject data includes isomorphically encrypted data. In some embodiments of the invention, the double encrypted subject data includes data encrypted by a public-private encryption key system. In some embodiments of the invention, the double encrypted subject data includes genetic data. The method 500 also includes, as shown at block 506 decrypting the double encrypted subject data with a broker decryption key to generate single encrypted subject data. The method 500 also includes, as shown at block 508, aggregating the single encrypted subject data. The method 500 also includes, as shown at block 510, including random factors in the aggregate single encrypted subject data to generate encrypted random factored data. The method 500 also includes, as shown at block 512, sending the encrypted random factored data to an analyst. In some embodiments of the invention, the data can be double encrypted before sending to an analyst.

Figure 6:
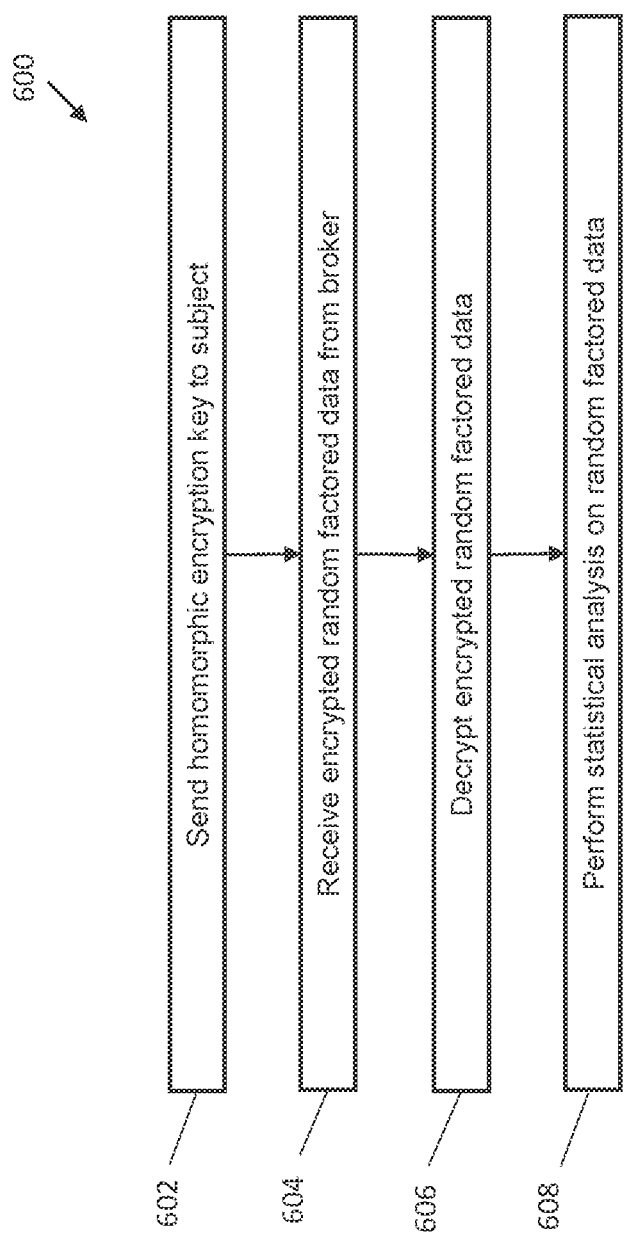
FIG. 6 is a flow diagram illustrating another method for protecting study participant data according to one or more embodiments of the present invention.

Turning now to FIG. 6, a flow chart illustrating an exemplary method 600 for protecting study participant data for aggregate analysis according to one or more embodiments of the present invention is shown. The method 600 includes, as shown at block 602, sending a homomorphic encryption key to a subject. The method 600 also includes, as shown at block 604 receiving encrypted random factored data from a broker. In some embodiments of the invention, the encrypted random factored data is aggregate study participant data. The method 600 also includes, as shown at block 606 decrypting the random factored data. The method 600 also includes, as shown at block 608, performing a statistical analysis on the random factored data. In some embodiments of the invention, garbling factors are applied to the intermediate regression matrix restrict resulting statistics for performing a statistical analysis on the random factored data.

Some embodiments of the invention include systems in which methods and functionalities included in the broker system are included in a subject system. For example, a subject can decrypt individual data. The broker does not include a decryption key in such embodiments and can provide aggregate data in the encrypted space in a way that enables the analyst to decrypt and use the aggregates, such as in homomorphic encryption.

In some embodiments, a random matrix is generated by the broker. The random matrix can protect against deductions based on individual aggregate scores.

In some embodiments of the invention, systems and methods are applied to genetic data, for instance in epidemiological studies.

For example, in one embodiment of the invention, aggregation is performed on singly homomorphically encrypted data. After aggregation and prior to sending data to an analyst, random factor inclusion can be performed. An analyst can then homomorphically decrypt the aggregated data to obtain random-factor coded numbers and, subsequently, extract the statistic for final analysis.

In some embodiments of the invention, systems and methods are applied to data intended for market research or commercial applications. For instance, a web browsing system can be interested in data for marketing purposes. The system can use individual data to infer purchasing patterns and apply that information to individuals to target advertisements according to the individuals' interests. The system can also sell that targeted information to interested third parties, for instance in the form of lists of people the system has identified as likely candidates or as a service to notify individuals of a service provider. The use of individual information, however, and its disclosure can be highly sensitive. Embodiments of the invention can protect the disclosure of highly sensitive data while providing a means to infer relevant information from protected data.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments of the invention, the practical application or technical improvement over technologies found in the marketplace, or to enable others of ordinary skill in the art to understand the embodiments described herein.

What is claimed is:

1. A computer-implemented method for protecting study participant data for aggregate analysis, the method comprising:

sending, by a processor, a broker encryption key to a plurality of research participant modules, each of the plurality of research participant modules separately having an isomorphic key having been sent from a researcher module, the isomorphic key being separate from the broker encryption key, the plurality of research participant modules being associated with different participants;

receiving, by the processor, double-encrypted subject data from the plurality of research participant modules, the double-encrypted subject data having been encrypted by both the isomorphic key and the broker encryption key;

decrypting, by the processor, the double-encrypted subject data with a broker decryption key to generate single-encrypted subject data from the plurality of research participant modules;

aggregating, by the processor, the single-encrypted subject data from the plurality of research participant modules to generate an aggregated single-homomorphically encrypted data set having encryption with the isomorphic key associated with the researcher module;

including, by the processor, a plurality of random factors in the aggregated single-homomorphically encrypted data set coded with a garbled circuit protocol, the plurality of random factors cancelling out when a statistical analysis using an odds ratio and a regression coefficient is performed on the aggregated single-homomorphically encrypted data set; and sending, by the processor, the aggregated single-homomorphically encrypted data set comprising the plurality of random factors to the researcher module having originally sent the isomorphic key to the plurality of research participant modules, thereby providing security and anonymity.

2. The computer-implemented method of claim 1, wherein the double-encrypted subject data comprises isomorphically encrypted data.

3. The computer-implemented method of claim 1, wherein the double-encrypted subject data comprises data encrypted by a public-private encryption system.

4. The computer-implemented method of claim 1, wherein the double-encrypted subject data comprises genetic data.

5. The computer-implemented method of claim 1 further comprising decrypting the aggregated single-homomorphically encrypted data set.

6. The computer-implemented method of claim 1 further comprising performing the statistical analysis on the aggregated single-homomorphically encrypted data set.

7. A computer program product for protecting study participant data for aggregate analysis, the computer program product comprising:

a computer readable storage medium having program instructions embodied therewith, wherein the instructions are executable by a processor to cause the processor to perform a method comprising:

sending a broker encryption key to a plurality of research participant modules, each of the plurality of research participant modules separately having an isomorphic key having been sent from a researcher module, the isomorphic key being separate from the broker encryption key, the plurality of research participant modules being associated with different participants;

receiving double-encrypted subject data from the plurality of research participant modules, the double-encrypted subject data having been encrypted by both the isomorphic key and the broker encryption key;

decrypting the double-encrypted subject data with a broker decryption key to generate single-encrypted subject data from the plurality of research participant modules;

aggregating the single-encrypted subject data from the plurality of research participant modules to generate an aggregated single-homomorphically encrypted data set having encryption with the isomorphic key associated with the researcher module;

including a plurality of random factors in the aggregated single-homomorphically encrypted data set coded with a garbled circuit protocol, the plurality of random factors cancelling out when a statistical analysis using an odds ratio and a regression coefficient is performed on the aggregated single-homomorphically encrypted data set; and sending the aggregated single-homomorphically encrypted data set comprising the plurality of random factors to the researcher module having originally sent the isomorphic key to the plurality of research participant modules, thereby providing security and anonymity.

8. The computer program product of claim 7, wherein the double-encrypted subject data comprises isomorphically encrypted data.

9. The computer program product of claim 7, wherein the double-encrypted subject data comprises data encrypted by a public-private encryption system.

10. The computer program product of claim 7, wherein the double-encrypted subject data comprises genetic data.

11. The computer program product of claim 7, wherein the method further comprises decrypting the aggregated single-homomorphically encrypted data set.

12. The computer program product of claim 7, wherein the method further comprises performing the statistical analysis on the aggregated single-homomorphically encrypted data set.

13. The computer program product of claim 7, wherein software is provided as a service in a cloud environment.

14. A processing system for protecting study participant data for aggregate analysis, the processing system comprising:

a processor in communication with one or more types of memory, the processor configured to perform a method comprising:

sending a broker encryption key to a plurality of research participant modules, each of the plurality of research participant modules separately having an isomorphic key having been sent from a researcher module, the isomorphic key being separate from the broker encryption key, the plurality of research participant modules being associated with different participants;

receiving double-encrypted subject data from the plurality of research participant modules, the double-encrypted subject data having been encrypted by both the isomorphic key and the broker encryption key;

decrypting the double-encrypted subject data with a broker decryption key to generate single-encrypted subject data from the plurality of research participant modules;

aggregating the single-encrypted subject data from the plurality of research participant modules to generate an aggregated single-homomorphically encrypted data set having encryption with the isomorphic key associated with the researcher module;

including a plurality of random factors in the aggregated single-encrypted data set coded with a garbled circuit protocol, the plurality of random factors cancelling out when a statistical analysis using an odds ratio and a regression coefficient is performed on the aggregated single-homomorphically encrypted data set; and sending the aggregated single-encrypted data set comprising the plurality of random factors to the researcher module having originally sent the isomorphic key to the plurality of research participant modules, thereby providing security and anonymity.

15. The processing system of claim 14, wherein the double-encrypted subject data comprises isomorphically encrypted data.

16. The processing system of claim 14, wherein the double-encrypted subject data comprises data encrypted by a public-private encryption system.

17. The processing system of claim 14, wherein the double-encrypted subject data comprises genetic data.

18. The processing system of claim 14, wherein the method further comprises decrypting the aggregated single-homomorphically encrypted data set.

* * * * *